United States Patent [19]

Slasor

[11] Patent Number: 4,805,931
[45] Date of Patent: Feb. 21, 1989

[54] LIGHTWEIGHT FOLDABLE WHEELCHAIR

[75] Inventor: James F. Slasor, Milton Keynes, England

[73] Assignee: The Spastics Society, London, England

[21] Appl. No.: 147,210

[22] Filed: Jan. 22, 1988

[30] Foreign Application Priority Data

Jan. 28, 1987 [GB] United Kingdom ............... 8701818

[51] Int. Cl.$^4$ ............................................ B62B 11/00
[52] U.S. Cl. .............................. 280/650; 297/DIG. 4; 280/250.1; 280/647; 280/657
[58] Field of Search ............... 280/242 WC, 289 WC, 280/42, 647, 648, 649, 650, 637, 47.37; 297/DIG. 4

[56] References Cited

U.S. PATENT DOCUMENTS

| | | | |
|---|---|---|---|
| 2,659,560 | 11/1953 | Lehmann et al. | 403/102 |
| 3,017,199 | 1/1962 | Sechrist | 297/DIG. 4 |
| 4,164,354 | 8/1979 | Rodaway | 280/42 |
| 4,457,535 | 7/1984 | Takeuchi et al. | 280/42 |
| 4,500,102 | 2/1985 | Haury et al. | 297/DIG. 4 |
| 4,560,033 | 12/1985 | DeWoody et al. | 297/DIG. 4 |
| 4,643,446 | 2/1987 | Murphy et al. | 280/648 |

FOREIGN PATENT DOCUMENTS

| | | |
|---|---|---|
| 1122983 | 8/1968 | United Kingdom . |
| 1140204 | 1/1969 | United Kingdom . |
| 1175684 | 12/1969 | United Kingdom . |
| 2017013 | 9/1979 | United Kingdom . |

Primary Examiner—David M. Mitchell
Assistant Examiner—Donn McGiehan
Attorney, Agent, or Firm—Larson & Taylor

[57] ABSTRACT

A foldable wheelchair having opposed main side frames each comprising front and rear members supported on respective front and rear wheels and connected by upper and lower cross members, and a back member mounted for folding movement relative to the rear member wherein the side frames are connected by first and second foldable links for maintaining the side frames spaced apart in the erected condition of the wheelchair in which the back members are aligned with the rear members and support a flexible back panel, and the wheelchair is collapsible to a compact folded condition by folding the links to move the side frames adjacent to each other and by folding the back members to extend downwardly adjacent to the rear members and the associated rear wheels.

20 Claims, 6 Drawing Sheets

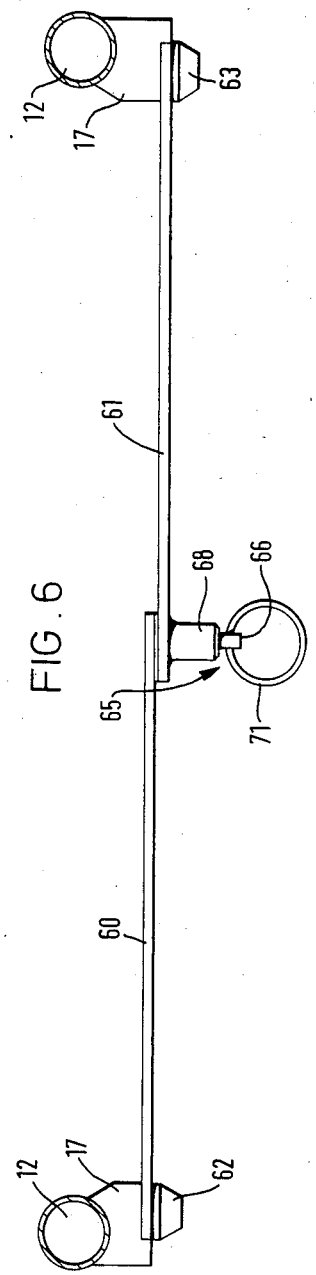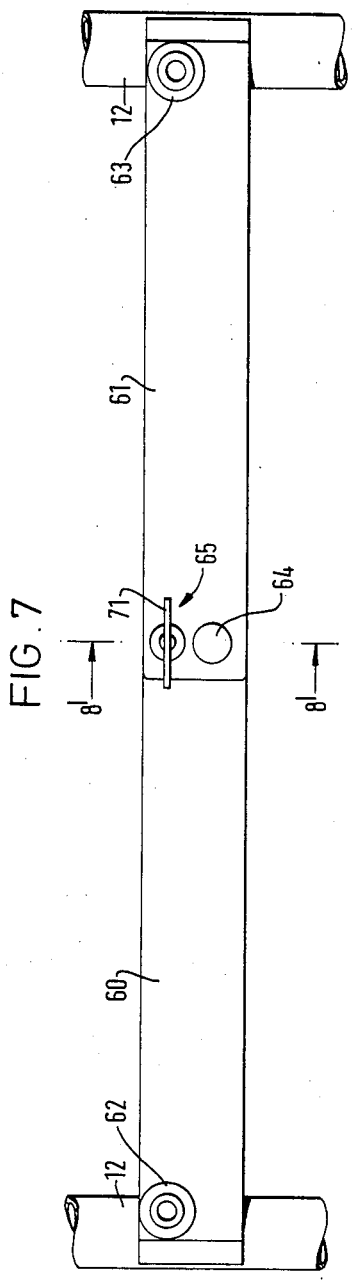
FIG. 6
FIG. 7

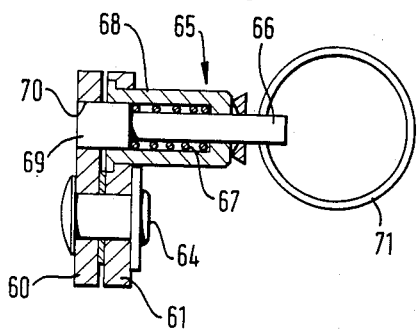
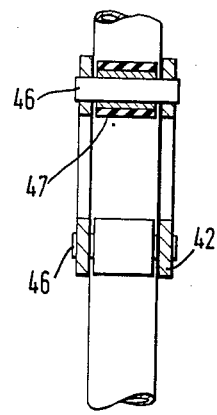
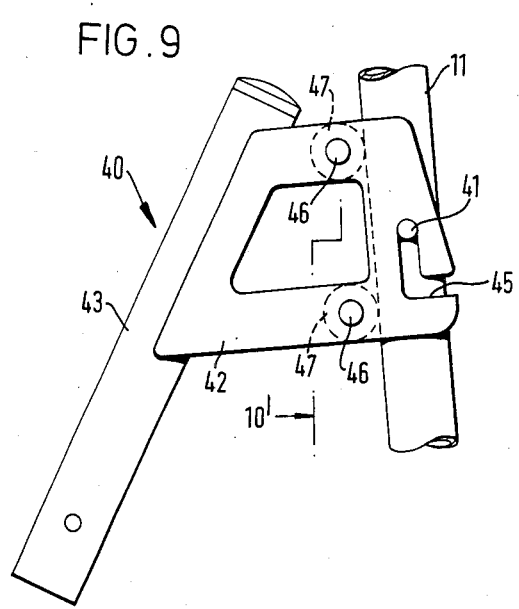

4,805,931

LIGHTWEIGHT FOLDABLE WHEELCHAIR

BACKGROUND OF THE INVENTION

This invention concerns wheelchairs of the foldable kind in which there are two main side frames connected together by foldable links and in which the seat and back panels are of flexible material that is foldable when the links are folded to bring the wheelchair into the folded position wherein the side frames are closely adjacent to each other.

Various designs of wheelchairs of this foldable kind are known. However, it is still required to provide foldable wheelchairs that are more compact when folded, either for storage or transport, and that are easier for use and adaptation for a range of different applications.

It is an object of this invention to provide an improved form of foldable wheelchair of the kind aforementioned which is more compact when folded than other foldable wheelchairs.

It is a further object of this invention to provide an improved wheelchair which is stable in the folded condition and which is arranged for easy portability.

Other objects of this invention include providing various special features in a foldable wheelchair of the kind afore-mentioned which facilitate both manufacture, use and adaptability.

SUMMARY OF THE INVENTION

According to this invention, I provide a foldable wheelchair of the kind comprising two main side frames connected together by foldable links, seat and back panels extending between the two main frames with the panels being of flexible material that is foldable when the links are folded to bring the wheelchair into the folded position wherein the side frames are closely adjacent to each other, each main side frame comprising a front member and a rear member connected together by upper and lower cross members with the front and rear members mounting respective front and rear wheels, each rear member having an upwardly extending back member hingedly connected for folding movement between an aligned first position for supporting the back panel when the wheelchair is in the erected condition and a folded position in which the back member is folded about the hinge remote from the front member to extend downwardly adjacent to the rear member with the handgrip beside the respective rear wheel, and each main frame being connected to the other by a first foldable link extending between the opposed back members and further connected together by a second foldable link extending between the opposed rear members, the arrangement of the main frames being such that in the erected condition with the back members being in the first position the first and second links maintain the frames spaced apart with seat and back panels extending between the respective upper cross members and the back members, and to fold the wheelchair, the first and second links are folded and the back members are turned about their hinges to be received with the back panel between the rear wheels with the two main frames being moved together with the seat panel folded therebetween.

By this invention, the wheelchair can be folded into a very compact form of a small height as the back members are folded downwards and confined between the rear wheels. In addition, in the folded condition, the wheelchair can be supported on the ground by its wheels and be stable due to the relatively low centre of gravity when all of the members are in the folded condition.

Preferably, each main side frame has a brake means mounted on the lower cross member with the brake means being supported for adjustment lengthwise of the cross member to enable the brake means to operate on any one of a range of rear wheels of differing diameters mounted on the associated rear member of the side frame.

By such an arrangement, the same main side frame can be used in the construction of various types of wheelchairs, for instance having large rimmed rear wheels with a hand rim or having smaller rims fitted with pneumatic tires for manual pushing of the wheelchair. Conveniently, in the invented wheelchair, the wheels mounted on the front members are small caster wheels.

It is also a preferred feature of the invented wheelchair that the first link extending between the back members is a simple two-armed link with one end of each arm being pivotally mounted on the respective one back member and the other ends of the arms being pivotally connected together to provide folding movement substantially centrally of the extended wheelchair. The second link preferably extends between the two rear members of the side frames and in this link there are also two arms of which one end of each is pivotally connected to the respective rear member but the pivotal connection of the other ends of each arm to each other includes a locking mechanism by which the second link may be secured in the extended position to prevent folding movement of the wheelchair when in the extended condition.

It is a further preferred feature of the invented wheelchair in that each main side frame includes a detachable support bar that extends from the upper end of the front member to the back member and is adapted to mount an arm rest and side panel. In this preferred feature, the arm rest and side panel can be connected or supported on the upper cross member with one end of the bar being received within a socket provided in the front member with the other end of the bar being connected to the back member through a pin and slot arrangement enabling disconnection of the bar from the back member for folding movement of the back member whilst providing a substantially secure connection when the wheelchair is in the erected condition to provide lateral stability to the side frame.

By such preferred feature of the detachable support bar and the arm rest and side panel, the compact folding of the wheelchair is obtained whilst providing the conventional form of arm rest and side panel as required by most users of wheelchairs.

Conveniently, the arm rest and side panel together with the associated support bar are adapted to be received in the pocket formed by the folded seat panel when the wheelchair is in the folded condition with the two main side frames closely adjacent each other.

In a preferred type of brake means, there is a manually operable handle that extends upwardly from the lower cross member towards the upper cross member, and this handle provides a support on each side of the space above the pocket to retain component parts of the wheelchair that are detached for transporting the wheelchair in the folded condition.

It is also preferred that the front member of each side frame detachably mounts a foot rest member that can be detached and received in the pocket between the two main side frames when the wheelchair is in the folded condition.

The various members of the wheelchair which are arranged to form each main side frame may be adapted for relative detachment from each other and for easy assembly. For instance, the frame members may be tubular and arranged to fit together by means of spigot and socket connections. By such an arrangement, the wheelchair can be manufactured in a simple manner and shipped or packed in a knockdown or kit form.

Other features of the invented wheelchair will be described and referred to later herein with reference to exemplary embodiments of wheelchairs according to the invention.

The invention will now be described with reference to exemplary embodiments of wheelchairs according to the invention as depicted in the accompanying drawings.

BRIEF DESCRIPTION OF THE DRAWINGS

FIG. 6 is a detail plan view of the second link of the wheelchair depicting the locking mechanism;

FIG. 7 is a front view of the second link as shown in FIG. 6; and

FIG. 8 is a sectional view on line 8'—8' given in FIG. 7.

FIG. 9 is a detail side view of the footrest connection to the front member of the wheelchair; and FIG. 10 is a detail sectional view on line 10'—10' given in FIG. 9.

DETAILED DESCRIPTION OF THE EXEMPLARY EMBODIMENTS

Figure 1:
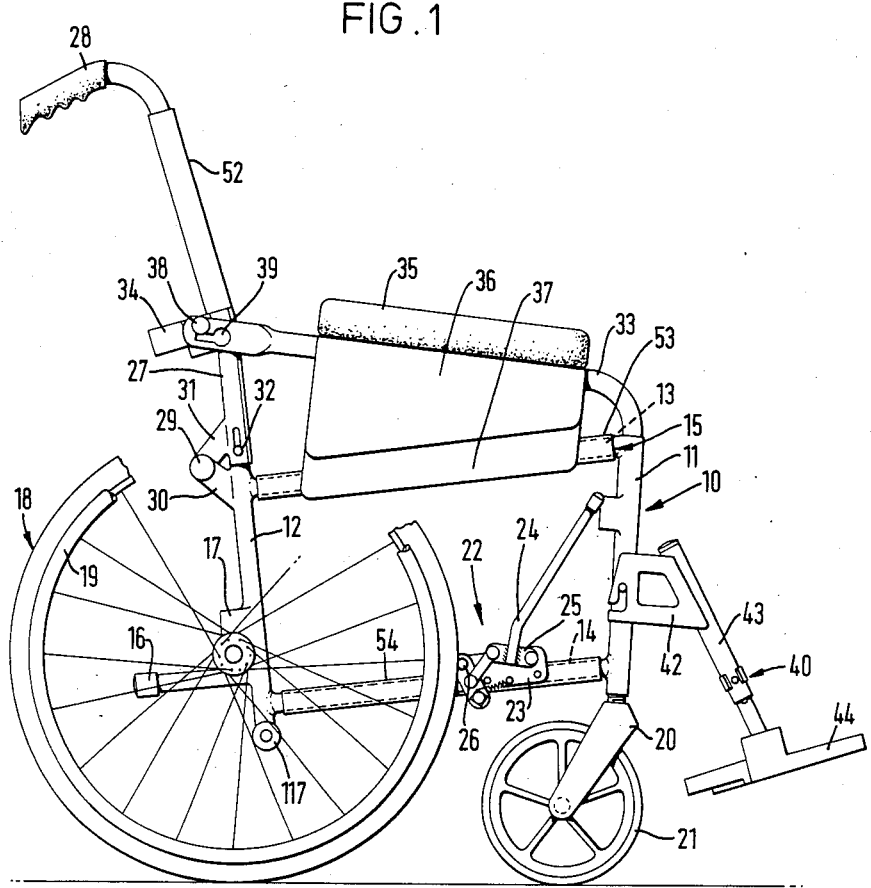
FIG. 1 is a side elevation of an exemplary wheelchair in the erected condition and having rear wheels with a hand rim.

With reference first to the drawings of FIGS. 1 to 4, the wheelchair shown comprises two main side frames 10 which are similar. Each frame 10 includes a front member 11, a rear member 12, an upper cross member 13 and a lower cross member 14. The cross members 13 and 14 are connected to the respective front and rear members 11 and 12 by spigot and socket connections generally referenced as 15 and which are simple spigots projecting from a tube fitting to be received within the hollow ends of the respective tubes forming the cross members 13 or 14. Each rear member 12 mounts a rearwardly projecting tipping leg 16 and a wheel mounting block 17. Carried on each mounting block 17 is a respective spoked wheel 18 having a hand rim 19 by which the user of the wheelchair may manually self-propel the chair.

The lower end of each front member 11 mounts a respective swivel support bracket 20 mounting a caster wheel 21. Each lower cross member 14 mounts a brake assembly 22 having a mounting bracket 23 by which the brake may be secured adjustably at the required position lengthwise of the cross member 14. The mounting bracket may include a bolt for engagement with spaced holes formed in the cross member 14. Alternatively, the mounting bracket may include a clamp member extending around the cross member 14 for clamping the bracket at the required position. On the mounting bracket 23 there is mounted a lever handle 24 which is operable by the user to move a spring-loaded linkage 25 to bring a shoe 26 into or away from frictional engagement with the tire of the wheel 18.

Figure 2:
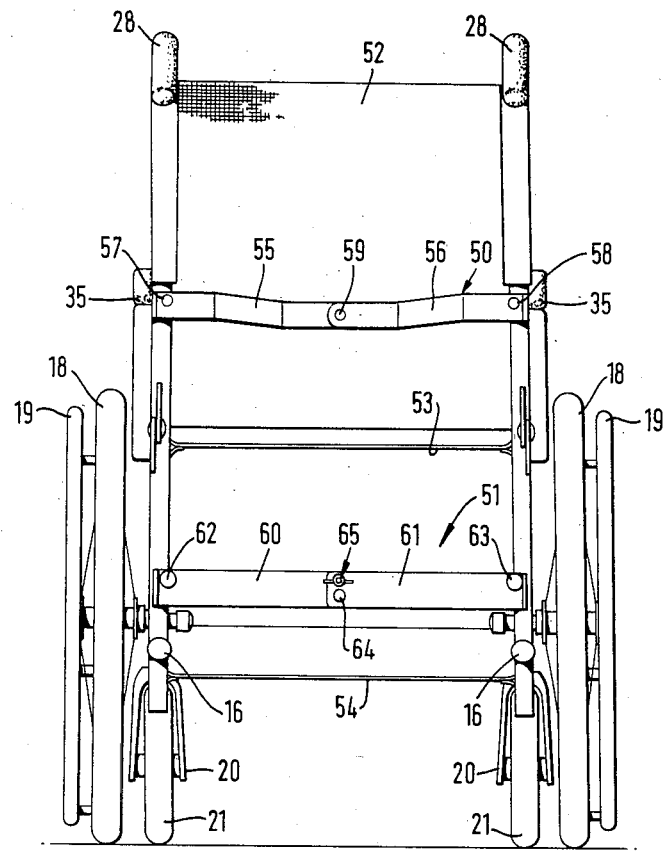
FIG. 2 is a rear elevation of the wheelchair depicted in FIG. 1 in the erected condition.

Each main side frame 10 further includes a back member 27 which in the erected condition of the wheelchair, as shown in FIGS. 1 and 2 extends aligned with the rear member 12. The back member 27 has a hand grip 28 at the upper free end for use, in known manner, for manouvring the wheelchair manually by an attendant. The back member 27 is connected to the rear member 12 by a hinge pin 29 extending through a rearwardly projecting hinge block 30 at the upper end of the rear member 12 with the back member 27 having a rearwardly projecting lug 31 through which the hinge pin 29 also extends. There is a locking guide pin and slot arrangement generally depicted at 32 by which the back member 27 is located and seated with respect to the associated rear member 12 when in the aligned position shown in FIG. 1.

In this embodiment of wheelchair, there is associated with each main side frame 10 a support bar 33 that is detachably connected to the upper end of the front member 11 and a support block 34 mounted on the respective back member 27. Each support bar 33 mounts an arm rest 35 and side panel 36 which has a lower support pad 37 attached to or engaging the upper cross member 15. The connection between the front member 11 and the support bar is a spigot and socket connection as previously mentioned. The other end of the support bar is detachably connected to the support block 34 by a pin 38 received within a staggered keyhole form of slot 39 that is formed in a flattened end portion of the support bar 33. To detach the support bar 33, the front end may be lifted clear of the socket in the front member 11, and then by a lifting and sliding movement, the other end of the support bar may be moved until the pin 38 is aligned and in register with the large end of the slot 39 so that such end of the bar 33 may be disconnected by a lateral movement clear of the pin 38.

As will now be appreciated, the support bar 33 when connected to the back member 27 and the front member 11 provides lateral rigidity to the side frame when the wheelchair is in the erected condition as shown in FIGS. 1 and 2. When the support bar 33 is disconnected and detached from the back member 27, then the back member can be unlocked from the pin and slot guide 32 and then hinged downwardly and rearwardly about the hinge pin 29 with the hand grip 28 lying adjacent the bottom of the respective rear wheels 18.

Each front member 11 detachably mounts a respective footrest assembly 40. As best seen in FIGS. 9 and 10, the front member 11 has a through pin 41 projecting on opposed sides to provide lugs to mount a bifurcated hanger bracket 42 that projects from a stem 43 on which the respective foot plate 44 (FIG. 1) is carried in known manner for adjustable or swivelling movement. Each arm of the bracket 42 is formed with a slot 45 of L-shape and extending between the two arms of the bracket 42 at spaced positions lengthwise of the extent of the member 11 are two respective bearing pins 46. A rubber or elastomeric bushing 47 is carried on each respective bearing pin 46 to extend between the two arms of the bracket 42. The spacing and axes of the pins 46 are arranged so that when the bracket 42 is fitted to the member 11, the respective bushings 47 abut on and engage the member 11 as the lugs enter the slot 45 and the bracket is moved relative to the member 11 until the lugs are received and seated in the closed bottom of the slot 45. By this arrangement, the footrest assembly 40 may be fitted or disconnected from the member 11 in a simple manner, and the rubber or elastomeric bushings provide a resilient engagement with the cross member both to maintain the bracket in position and to apply resilient loading to the footrest assembly in use to preclude rattle and wear.

With particular reference to FIG. 2, the two main side frames 10 of the wheelchair are connected together by an upper first link 50 and a lower second link 51. A back panel 52 extends between the two back members 27 and is made of suitable flexible material such as PVC coated linen or other textile material. A seat panel 53 of similar flexible material extends between the upper cross members 13 and, as an optional feature, a tray panel 54 of the same material extends between the two lower cross members 14. In known manner, the back and seat panels 52,53 provide the support for the user when the wheelchair is in the erected condition.

The first link 50 comprises two opposed arms 55,56 which are each pivotally mounted to a back member 27 by a respective pin 57,58 carried adjacent to the block 34 on each back member 27. The other ends of each arm 55,56 are coupled together for relative folding movement by a pivot pin 59. Each arm has a slight crank so that the axes of pivotal movement about the pins 57,58 and pin 59 are non-aligned whereby when the link 50 is extended in the position shown in FIG. 2 it is in an over-center position precluding accidental re-folding movement.

The second link 51 also comprises two arms 60,61 which are each connected to one rear member 12 by respective pivot pins 62, 63 that are each mounted on the respective mounting blocks 17. As best shown in FIGS. 6,7 and 8, the arms 60 and 61 are connected together at their other ends by a pivot pin 64 and there is an associated locking mechanism 65 which is arranged to secure the arms 60,21 against re-folding movement when the link 51 is in the extended position as shown in FIG. 2.

The locking mechanism 65 comprises a pull-pin 66 that is biassed into a locking position as shown in FIG. 8 by a helical spring 67 extending around the shank of the pin 66 that is received within a hollow housing 68. The pin 66 has an head 69 that is arranged to be received within a complementary hole or recess 70 in the end of the link arm 60 when the two arms 60,61 are in the aligned position as shown in FIG. 2. To fold the link 51 all that is required is to pull the pin 66 by the ring 71 in order to overcome the spring bias and to release the head 69 from engagement with the recess 60.

Figure 5:
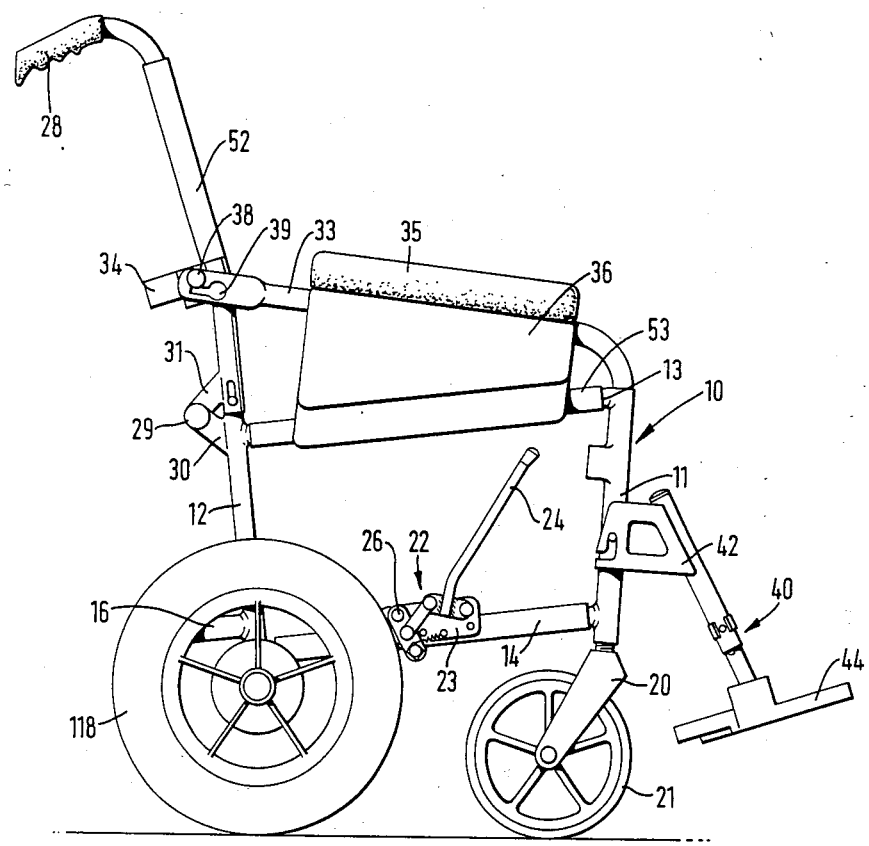
FIG. 5 is a side elevation of a modified wheelchair having small rear wheels.

In the foregoing description of the construction and arrangement of the invented wheelchair various features have been explained with reference to the wheelchair in the extended condition. It is here convenient to refer to the modified form of wheelchair as shown in FIG. 5 wherein the construction and arrangement of the two main side frames 10 is the same as just described and for which the same reference numerals have been used. In this modification, the rear wheels are small wheels 118 having pneumatic tires of large cross-section with the wheelchair being designed for manual use by an attendant. As will be understood, the same main side frames 10 and other component parts are used in this wheelchair as in the embodiment first described, and by the adjustable feature of the manual brake 22 this may be located and secured to the respective lower cross members 14 at the correct position to engage the smaller diameter tire of the wheel 118. The wheel mounting block 17 used for the larger wheels 18 is left void and a secondary lower wheel mounting block 117 depending from the lower rear end of the rear member 12 is used to support the wheel spindle.

Such features of the inter-changability of the different size wheels whilst using all other common parts for the frame and associated fittings results in substantial advantages both for manufacture and stockists who may fit the required sized wheels and make the adjustment to the brake from standard components held in stock.

Figure 3:
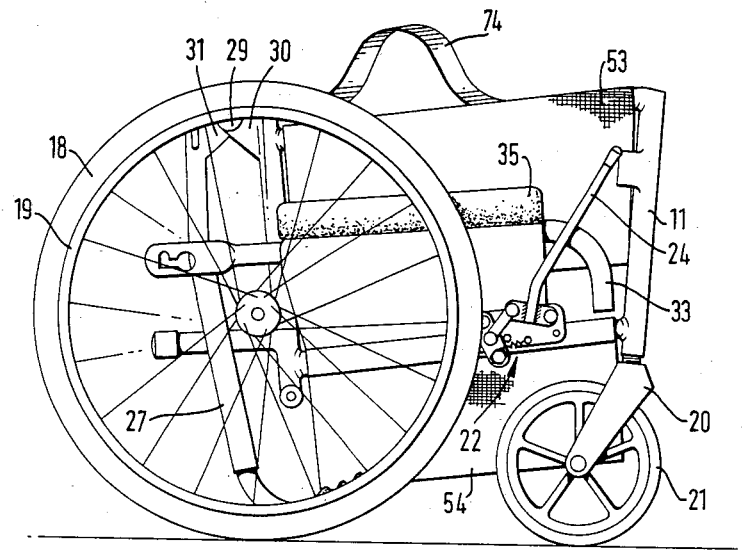
FIG. 3 is a side elevation of the wheelchair depicted in FIG. 1 but shown in the folded condition.

The folding features and compact nature of the invented wheelchair will now be described with reference to FIGS. 3 and 4.

To fold the wheelchair, the arm rest and side panels are detached in the manner previously explained, and then the back members 27 can be folded down rearwardly about their hinge pin 29 connection to the rear members 12. The upper link 50 is released from the over centre position and the locking mechanism 65 of the lower second link 51 is released. Both links can then be folded so that the two side frames 10 can be brought together with the flexible back and seat panels 52,53 folding as well. The seat panel 52 is confined between the two side frames 10 and falls down between the two sets of cross members to form a pocket therebetween. Where provided, the tray panel 54 also forms a pocket. The back panel 52 is folded between the two back members 27 and is received between these members that extend between the rearward parts of the wheels 18 and associated parts of the frames 10.

The footrest assemblies 40 which are also detached can be laid within the pocket so formed by the seat panel 52 and/or the optional tray panel 54 with the arm rest and side panels being placed beside the respective cross members of each side frame. The upstanding brake lever 24 provides a support to confine and retain the arm rests and side panels within the folded embrasure of the side frames. To hold the wheelchair in this folded position, a small latch link 72 mounted on one of the front members 11 may be closed over a stud 73 on the other front member.

Figure 4:
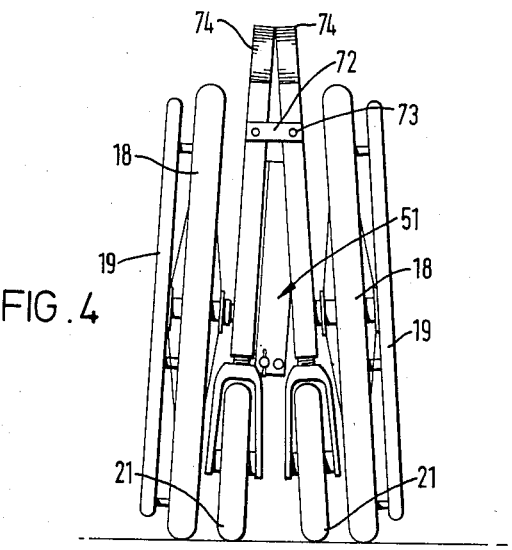
FIG. 4 is a front elevation of the folded wheelchair as shown in FIG. 3.

As best seen in FIG. 4, the folded wheelchair is very compact with the wheels to front and rear being such as to enable the folded wheelchair to be manouvred without toppling due to the low centre of gravity of the folded assembly. If desired, the upper cross members may have handle straps 74 fixed thereto which are normally covered by the arm rests when the wheelchair is in the erected condition. These handle straps may be used to lift or carry the folded wheelchair.

The folded wheelchair is so compact that it can be fitted into a suitable bag for storage or transport.

The invented wheelchair provides many advantageous features for the manufacturer, stockist and user, and these will be appreciated by those familiar with this subject field.

The overall weight of the wheelchair can be very low if suitable lightweight aluminium alloy tubing is used for the main frame members including the support bar. By suitable design of the footrest assembly and other components, the weight of the wheelchair can be designed for easy portability.

It will also be appreciated that minor modifications or changes to the various parts and fittings can be accommodated within the general concept of this invention. In particular, but not exclusively, the width of the wheelchair can be changed by altering the size of the panels and the lengths of the arms of the first and second links. These changes are minimal as the main side frames do not have to be modified at all.

Although the exemplary embodiments described herein only show and refer to two sizes or types of rear wheels, it is possible to use a range of different types and styles or wheels, and various alternative kinds of wheel mounting blocks could be incorporated in the construction and assembly of the main side frames. Furthermore, other changes to wheel types and the casters can be incorporated.

All of these alternatives and modifications are considered within the scope of this invention.

I claim:

1. A foldable wheelchair comprising two main side frames connected together by first and second foldable links, seat and back panels extending between said two main side frames with said panels being of flexible material that is foldable when said links are folded to bring the wheelchair into a folded condition wherein said main side frames are closely adjacent to each other, each said main side frame comprising a front member and a rear member connected together by upper and lower cross members with said front and rear members mounted respective front and rear wheels, each said front member mounting a detachable footrest assembly including a bifurcated hanger bracket having spaced apart arms between which said front member is received with each said arm having a slot for reception of a lug on said front member to secure releasably said footrest assembly to said front member and, upper and lower resilient bushings between said arms and engageable with said front member to load resiliently said footrest assembly, each said rear member having an upwardly extending back member hingedly connected for folding movement between an aligned first position for supporting said back panel when the wheelchair is in an erected condition and a folded second position in which said back member is folded about said hinge remote from said front member to extend downwardly adjacent to said rear member with the handgrip of said back member beside the respective said rear wheel, and each said main side frame being connected to the other by said first foldable link extending between the opposed said back members and further connected together by said second foldable link extending between the opposed said rear members, the arrangement of said main frames being such that, in said erected condition of the wheelchair with said back members being in said aligned first position, said first and second links maintain said main side frames spaced apart with said seat and back panels extending between the respective said upper cross members and said back members, and to fold the wheelchair, said first and second links are folded and said back members are turned about their hinges to said folded second position to be received with said back panel between said rear wheels with said two main side frames being moved together with said panel folded therebetween.

2. A wheelchair according to claim 1 wherein said first link is a two-armed link with one end of each arm being pivotally connected to the respective said back member and the other ends of said arms being pivotally connected together.

3. A wheelchair according to claim 2 wherein said first link unfolds to an overcentre position for securing said arms in said erected condition of the wheelchair.

4. A wheelchair according to claim 1 wherein said second link is a two-armed link with one end of each arm pivotally connected to the respective said rear member and the other ends of said arms being pivotally connected together.

5. A wheelchair according to claim 4 wherein said second link includes a locking mechanism for securing said arms in said erected condition of the wheelchair.

6. A wheelchair according to claim 5 wherein said locking mechanism includes a-locking pin on one arm biassed to engage said other arm in a locking position.

7. A wheelchair according to claim 1 wherein said seat panel forms a seat panel pocket when folded for storing detachable components of the wheelchair.

8. A wheelchair according to claim 1 wherein a tray panel of flexible material extends between said lower cross members and is folded between said two main side frames in said folded condition of the wheelchair.

9. A wheelchair according to claim 8 wherein said tray panel forms a tray panel pocket when folded for storing detachable components of the wheelchair.

10. A wheelchair according to claim 1 wherein each said main side frame includes a detachable support bar that extends from the upper end of said front member to said back member.

11. A wheelchair according to claim 10 wherein each said support bar mounts at least one of an arm rest and a side panel.

12. A wheelchair according to claim 1 wherein said lower cross member of each said main side frame mounts brake means for one of said associated wheels.

13. A wheelchair according to claim 12 wherein each said brake means is adjustable lengthwise of the associated said lower cross member.

14. A wheelchair according to claim 12 wherein each said brake means comprises a shoe and a spring loaded linkage operable by a lever for moving said shoe into or away from frictional engagement with the associated said wheel.

15. A wheelchair according to claim 1 wherein each said main side frame has a plurality of wheel mounting blocks for mounting wheels of different diameter.

16. A wheelchair according to claim 1 including releasable latch means for holding the wheelchair in said folded condition.

17. A wheelchair according to claim 1 including a handle strap attached to said upper cross member of at least one said main side frame.

18. A wheelchair according to claim 1 wherein one of said wheels associated with each said main side frame has a hand grip for manual self-propulsion of the wheelchair.

19. A foldable wheelchair comprising seat and back panels of flexible material extending between two opposed main side frames, each said main side frame comprising a front member and a rear member connected together by upper and lower cross members with said front and rear members mounting respective front and rear wheels, each said rear member having a back member hingedly connected thereto for folding movement between an aligned first position in which said back member extends upwardly from said rear member and a second folded position in which said back member extends downwardly adjacent to said rear member and the associated said rear wheel, a first foldable link extending between the opposed said back member and a second foldable link extending between the opposed said rear members, said first and second links maintaining said main side frames spaced apart in an erected condition of the wheelchair and being foldable to bring said main side frames closely adjacent to each other in a folded condition of the wheelchair, and each said front member mounting a detachable footrest assembly including a hanger bracket having spaced apart arms between which said front member is received with each said arm having a slot for reception of a lug on said front member to secure releasably said footrest assembly to said front member and, upper and lower resilient bushings between said arms and engageable with said front member to load resiliently said footrest assembly.

20. A wheelchair comprising a frame, a pair of front wheels mounted on said frame, a pair of rear wheels mounted on said frame, and a detachable footrest assembly including a hanger bracket for releasably securing said footrest assembly to said frame to permit said footrest assembly selectively to be removed from and resecured to said frame, said hanger bracket having spaced apart arms between which a member of said frame is received with each said arm having a slot for reception of a lug on said member to secure releasably said footrest assembly to said member and, upper and lower resilient bushings between said arms and engageable with said member to load resiliently said footrest assembly.

* * * * *